March 7, 1944.  C. E. SWANN  2,343,847
CREAM DISPENSER
Filed Jan. 24, 1941  2 Sheets-Sheet 1
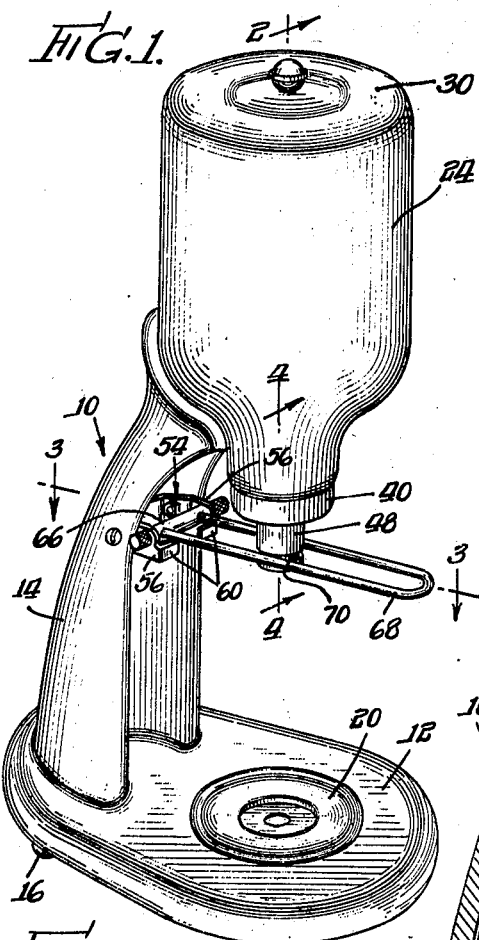
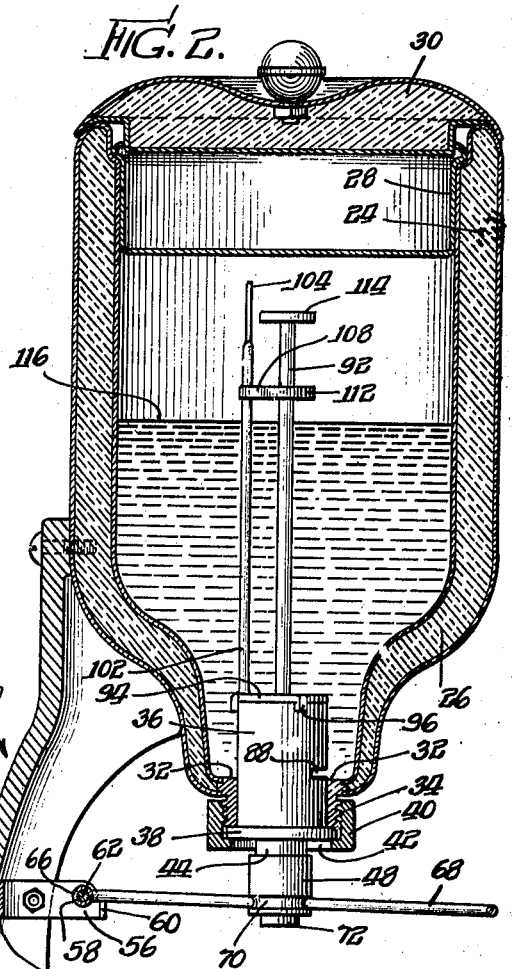
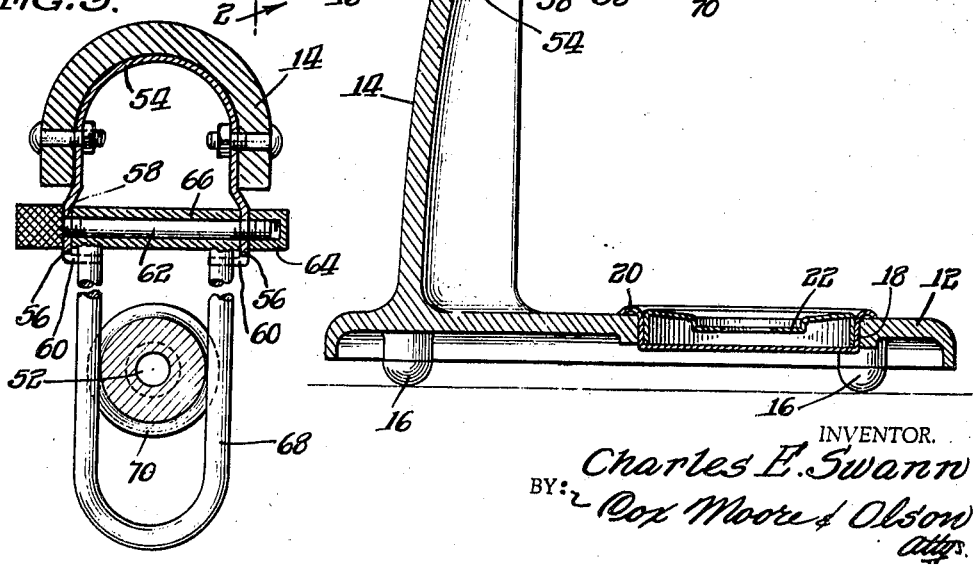
INVENTOR.
Charles E. Swann
BY Cox, Moore & Olson
Attys.

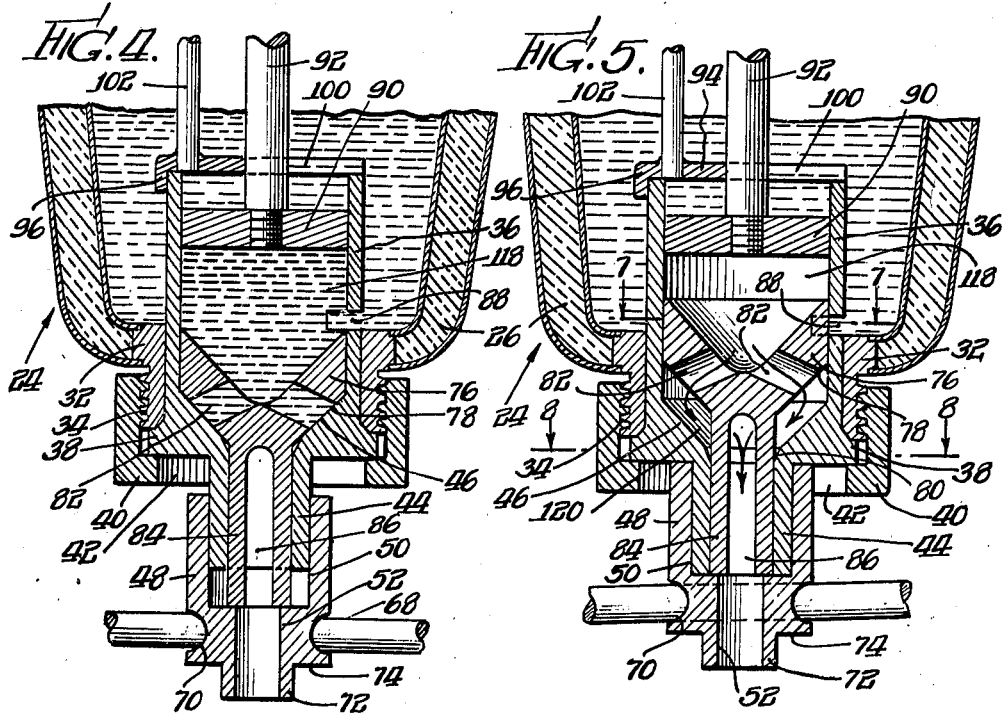
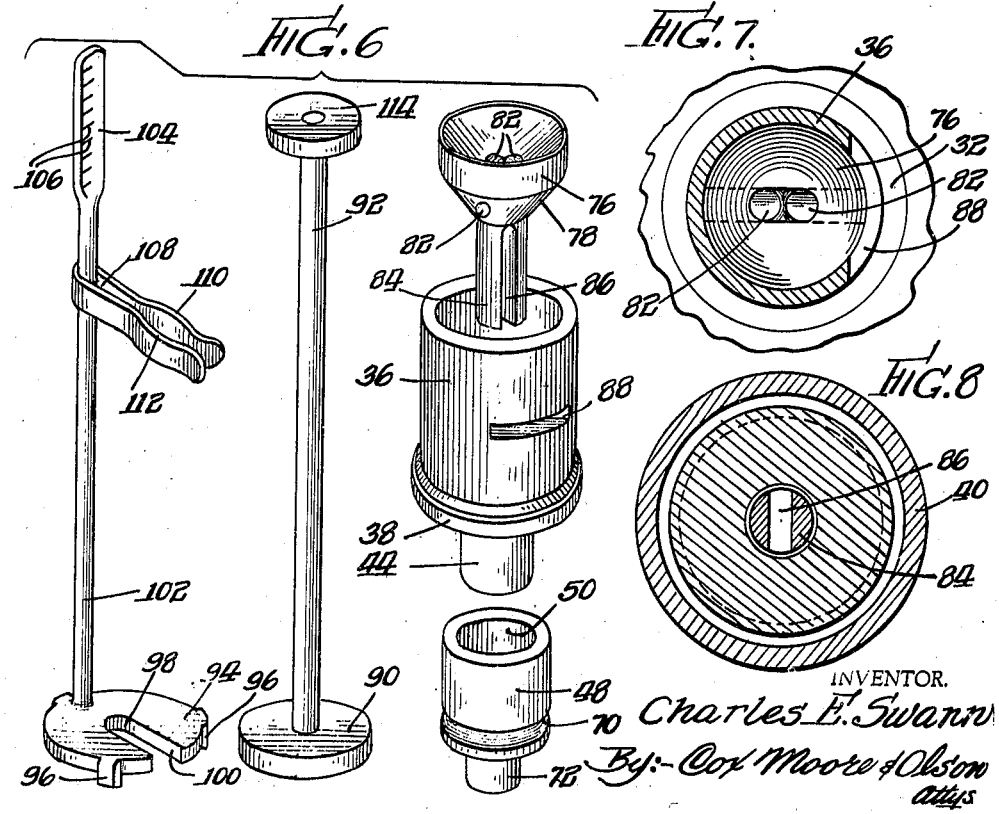

Patented Mar. 7, 1944

2,343,847

UNITED STATES PATENT OFFICE 2,343,847

CREAM DISPENSER

Charles E. Swann, Glencoe, Ill., assignor to Craft Manufacturing Co., Chicago, Ill., a corporation of Illinois Application January 24, 1941, Serial No. 375,733

11 Claims. (Cl. 221—114)

This invention relates to liquid dispensing apparatus. More particularly, it relates to apparatus for dispensing measured quantities of cream.

Apparatus for dispensing both liquids generally and cream in particular are known in the art. These devices suffer from numerous disadvantages, however, among which are that the structures are unnecessarily complicated and that in many which function satisfactorily otherwise the liquid is dispensed only after a plurality of operations performed on the apparatus instead of immediately upon the first operation. Thus, liquid dispensing devices are known in which pressure applied vertically adjacent the outlet and then released results in the discharge of a quantity of liquid. It would be highly desirable, however, to have the liquid dispensed immediately upon the application of pressure, thereby eliminating one operation as a prerequisite to the discharge of the liquid.

It is, therefore, an object of this invention to provide a liquid dispensing apparatus of simplified construction.

A more specific object is to provide a cream dispensing device of simplified construction which is readily cleaned.

Another object of the invention is to provide a liquid dispensing apparatus which is adapted to dispense measured quantities of liquid immediately upon its actuation.

A further object is to provide a liquid dispensing apparatus adapted to be actuated by upward movement of the member in which the opening through which the liquid is discharged from the apparatus is located immediately upon such upward movement.

Another object is to provide a liquid dispensing apparatus for dispensing measured quantities of liquid, in which the measuring chamber is continuously charged with liquid in its normal position so that upon the opening of the outlet the measured quantity of liquid is promptly discharged, the closure of the outlet again restoring the apparatus to position where the measuring chamber is again charged.

Another object is to provide a liquid dispensing apparatus for dispensing measured quantities of liquid and including means whereby the quantity of liquid dispensed is readily adjusted.

Another object is to provide a liquid dispensing apparatus adapted to dispense measured quantities of liquid immediately upon actuation thereof and including means for adjusting the quantity of liquid dispensed at each operation.

Other objects will appear hereinafter.

The foregoing objects are accomplished by the structure illustrated in the accompanying drawings which form a part of this specification and in which Figure 1 is a view in perspective of a liquid dispensing device involving features of the present invention;

Figure 2 is a vertical section on the line 2—2 in Figure 1;

Figure 3 is a horizontal section on the line 3—3 in Figure 1;

Figure 4 is an enlarged detailed vertical section through a portion of the apparatus on the line 4—4 in Figure 1;

Figure 5 is a view similar to Figure 4, showing the parts of the apparatus in another position;

Figure 6 is an exploded view in perspective of the parts of the measuring and dispensing means;

Figure 7 is a partial horizontal section on the line 7—7 in Figure 5; and

Figure 8 is a partial horizontal section on the line 8—8 in Figure 5.

The apparatus is supported on a framework designated generally 10, including a base 12 and an upright 14. The base is supported on feet 16 and is provided with an opening therethrough, as at 18, to receive a drip cup 20. A dished-out receptacle supporting member 22 having a central opening therethrough is positioned in the drip cup 20, as shown. Supported on the upright 14 is a generally cylindrical cream supply vessel 24. The cream supply vessel 24 is of double wall construction, having heat insulating material 26 between the walls. A dish shaped ice container 28 is positioned in the top of the cylindrical cream supply vessel to provide means for retaining cream contained within the vessel 24 at a relatively low temperature. A lid 30 closes the top and provides means for supplying cream to the interior of the vessel 24. Toward the lower end vessel 24 narrows gradually so that even when the cream supply is low a substantial head of cream is provided.

Positioned in a generally circular opening centrally of the bottom of vessel 24 is an annular collar 32 which projects below the bottom of the vessel 24 and is threaded as at 34. Fitting in liquid-tight relationship within the collar 32 is a cylinder 36 provided with a flange 38 on its lower end. The cylinder 36 is supported in place by nut 40 threaded onto the lower end of collar 32 and turned up to press the flange 38 tightly against the lower face of collar 32. It will be noted that nut 40 is provided with a central opening 42 somewhat larger in diameter than the opening through collar 32. Projecting downwardly from the cylinder 36 through opening 42 is a spout 44 formed integral with the cylinder 36. As may be seen by reference to Figures 4 and 5, the cylinder 36 is thickened near the bottom to provide a gradually tapering inner wall, as at 46, which terminates in the central opening in spout 42.

Slidingly mounted on the spout 44 is a collar 48 having a large opening 50 in the top portion thereof to receive the spout 44, and a much smaller opening 52 aligned therewith in the lower part. The opening 52, it will be noted, is substantially smaller in diameter than the opening through spout 44 so that a portion of collar 48 projects inwardly over the end of the opening in spout 44.

Mounted on the framework 14, slightly below the level of the lower end of spout 44, is a metal strip 54 bent to conform to the curved inner surface of the upright 14. The ends of the strip 54 projecting inwardly, as at 56, are provided with openings 58. At each inner extremity of strip 54 the upper half of the strip is cut away and the lower halves 60 are laterally bent toward each other. A rod 62 threaded on one end to receive a knurled nut 64 projects through the openings 58. Mounted on this rod between the ends 56 is a collar 66 to which are secured the ends of a reversely bent rod 68 which extends outwardly from collar 66 and passes through an annular groove 70 on collar 48 and backwardly again through groove 70 on the other side of collar 48 to collar 66. It will be apparent that with this structure the movement of collar 48 is controlled by raising and lowering the rod 68. The inturned lower halves 60 serve as a stop for the downward movement of rod 68 and thus limit the downward movement of the collar 48.

It will be noted that at its extreme lower end the diameter of collar 48 is decreased to provide a spout-like portion 72 around which the opening in a receptacle for the dispensed cream may be placed in order to facilitate delivery of the cream into the receptacle without waste. In this connection, it should also be noted that the necessary upward pressure on collar 48 to lift it may be exerted through the medium of the receptacle pressing on the surface 74 of collar 48.

Mounted to reciprocate in cylinder 36 is a piston 76. The fit between piston 76 and the interior of cylinder 36 need not be liquid-tight. Having in mind the viscosity of the liquid to be dispensed, in this instance, cream, the piston 76 should fit sufficiently tightly within the cylinder 36 as to prevent any considerable liquid flow around it. The general form of the piston 76, as may be seen, is that of a cone, the lower surface 78 conforming in general to the configuration of the lower surface of cylinder 36, although the lower surface of cylinder 36 is provided with a slightly sharper taper, as at 80, adjacent the spout 44.

Extending from the lowermost part of the cone-shaped hollow on the upper surface of the piston 76 is a pair of openings 82 which terminate on the lower face of the piston 76 opposite the portion of the bottom wall of the cylinder 36 with which the under surface of piston 76 coincides. As may be seen, the openings 82 have a gradually downward and outward slope. Projecting downwardly in the opening in spout 44 is a stem 84 integral with piston 76. Stem 84 is fitted within the opening in spout 44 for smooth sliding movement therein. A slot 86 extends diametrically across the stem 84 and substantially the full length of the stem.

Located just above the piston 76 when piston 76 is resting on the bottom of cylinder 36 is an elongated slot 88 providing fluid communication between the interior of chamber 24 and the interior of cylinder 36. It will be noted that the cylinder 36 is so located that the slot 88 is located substantially at the lower level of the chamber 24.

Located within the cylinder 36 above piston 76 is a disk 90. The disk 90 is proportioned to slide freely within cylinder 36 and preferably is large enough to prevent any considerable leakage of liquid around it, although some small leakage is not objectionable. Disk 90 is provided with a threaded central aperture to receive the threaded lower end of a hollow rod 92 which extends upwardly therefrom to a point relatively close to the lower surface of the pan 28. Disk 90 and rod 92 thus form a plunger.

The position of the upper end of rod 92 may be varied as desired, but it should be located above the maximum level of the cream which is placed in the vessel 24. Mounted on top of the cylinder 36 is a flat plate 94 removably held on the top of the cylinder by three downwardly projecting lugs 96 formed integral therewith.

A central aperture 98 and a slot 100 extending outwardly therefrom are provided in plate 94 to receive rod 92. Extending upwardly near the outer periphery of plate 94 opposite the opening 98 and the slot 100 is a rod 102, the upper end 104 of which is flattened and provided with uniformly spaced indicia 106. Located below the flattened end 104 of rod 102 is a spring clip 108 secured to rod 102 and extending outwardly in alignment with the opening 98 and the slot 100. The rod 92 is received between the outer ends of clip 108 in the space provided between the bulged portions 110 and 112 and a plunger formed by disk 90 and rod 92 is thus slidably supported by clamp 108. Another disk 114, threadedly mounted on the upper end of rod 92, is thus positioned opposite the spaced indicia 106 on the flattened end 104 of rod 102.

To dispense cream from the apparatus a supply of cream is placed in the vessel 24 up to the level 116 indicated in Figure 2 or to any other desired level below that of the upper end of the rod 92. As may be seen, the position of the disk 90 within the cylinder 36 controls the space between the disk 90 and the piston 76, and thus determines the quantity of cream dispensed in each operation. The indicia 106 on the flat upper end of rod 102 may be calibrated in any desired way so that one of the indicia 106 which is opposite the disk 114 will indicate the position of the disk 90 in the cylinder 36 and thus the size of the quantity of cream dispensed.

With the disk 90 in the desired position the apparatus is ready to dispense a quantity of cream immediately. It will be apparent that the measuring space 118 is filled with cream which flows in through the slot 88 from the supply in the vessel 24. The space 118 becomes filled with cream by reason of the fact that air therein is free to escape through the hollow rod 92 to the air space above the level 116 of the cream in vessel 24. At this point the apparatus is in the position shown in Figure 4, the piston 76, the stem 84, and the collar 48 all being fitted sufficiently loosely so that gravity will cause them to descend to the lowermost position which they may occupy.

In this connection, it should be noted that the length of stem 84 should be such as to permit the lower surface of piston 76 to rest against the bottom of cylinder 36 when the apparatus is in normal position, thereby closing the openings 82 through the piston 76. Since these openings 82 are closed, although they will be filled with cream when the space 118 is filled with cream, no cream can escape from the measuring space 118.

To dispense the measured sample, it is only necesssary to press upwardly on the collar 48. This may be done, as indicated above, by pressing a receptacle up around the spout 72. The collar 48 moves upwardly into contact with the lower end of stem 84 and in turn lifts stem 84 and piston 76 away from the bottom surface of cylinder 36. Cream then flows, as indicated by the arrows in Figure 5, from the measuring space 118 down through openings 82, thence through the space 120 left between the under surface of piston 76 and the bottom surface of cylinder 36, thence down the slot 86 in stem 84, and outwardly through the opening in collar 48 and the spout 72 into the receptacle. Sufficient upward travel of piston 76 is provided so that the piston 76 moves up over the slot 88 and closes it. This prevents additional cream from flowing in until after the measured quantity has been discharged. The space provided by the increased slope of the bottom of cylinder 36, as at 80, serves to permit the escape of the last quantity of cream which may remain below piston 76, even after the piston has almost returned to normal position on the bottom of cylinder 36.

Attention is directed to the fact that as the piston 76 moves upwardly it exerts pressure on the cream in space 118. This serves to hasten the discharge of the measured quantity of cream from this space and out of the apparatus, as set forth above.

When the sample has been dispensed, the force exerted upwardly on collar 48 is released and the piston 76, stem 84, and collar 48 return by gravity to normal position, their downward movement being checked by the ends 56 of strip 54, as indicated above, and by the bottom of the cylinder 36. Cream can now again flow into the space 118 and fill it so that the apparatus is prepared for the discharge of another quantity of cream.

Although the apparatus is not limited as to materials of construction, it will be apparent that the piston 76 and/or the stem 84, as well as the collar 48, should be of a material having a density sufficient to permit it to be returned to normal position by the operation of gravity. If desired, however, instead of relying upon gravity, means may be provided, in addition thereto, for returning these portions to normal position. Preferably, those parts of the apparatus which come into contact with the cream being dispensed will be constructed of stainless steel, the other parts being constructed of any desired material.

Although the apparatus has been particularly described with respect to and designed for the dispensing of cream, it will be apparent that numerous features are applicable to the dispensing of liquids generally. The invention, therefore, is not limited exclusively to apparatus for dispensing cream. It will be apparent that it is particularly applicable to the dispensing of liquids having characteristics generally similar to those of cream, however.

It is a distinct advantage of the apparatus disclosed herein that it is simple both in construction and operation. The parts in contact with the cream, particularly the measuring and dispensing portions, are readily removed for cleaning. An outstanding advantage of the apparatus, however, is that the cream is dispensed immediately upon actuating the apparatus. In apparatus heretofore known for dispensing cream it is necessary to perform at least two operations, such as pushing up on some part in order to fill the measuring chamber, and then pushing or otherwise bringing it back to the first position, in order to dispense the measured quantity. In the present apparatus the measured quantity is dispensed immediately upon the performance of the first operation on the apparatus. This makes for speed in dispensing cream, a highly desirable feature in places where cream is served in large quantities since it decreases the time required to draw the desired quantity. It is further important to note that this desirable feature is found in a very simple and uncomplicated apparatus.

The means for adjustably determining the quantity of cream dispensed at each operation is also an important feature. It is not only simple in construction but is readily adjusted to any desired position, and the size of the sample may be readily predetermined accurately by calibration of the indicia 106.

The location of the slot 88 substantially at the lower level of the cream supply vessel 24 facilitates the dispensing of a maximum amount of the cream supplied to the vessel 24. Actually, it will be apparent that substantially as long as sufficient cream is present in vessel 24 to make a quantity of the desired size the apparatus will continue to dispense uniform quantities of cream.

Many other advantages of the invention will be obvious from the foregoing description. It is apparent that many widely different embodiments of this invention may be made without departing from the spirit and scope thereof, and therefore it is not intended to be limited except as indicated in the appended claims.

The invention is hereby claimed as follows:

1. In a liquid dispensing apparatus, the combination of a measuring chamber having an opening in its side wall to admit a liquid to be dispensed and an opening in its lower extremity to discharge the measured quantity of liquid, a piston having an opening therethrough arranged in the measuring chamber to reciprocate adjacent the outlet, the lower face of the piston surrounding said opening through the piston being adapted to abut the bottom wall of the measuring chamber and close said opening through the piston when said piston is in its lowermost position, and said piston being arranged to pass over and close said opening in the side wall of the measuring chamber in its uppermost position whereby when said piston is in its uppermost position the contents of said measuring chamber are discharged and when said piston is in its lowermost position the chamber is supplied with liquid to be dispensed.

2. In a liquid dispensing apparatus, a stationary measuring chamber having air inlet and outlet means at its upper end and liquid outlet means at its lower end, means to supply liquid to be dispensed to said chamber, a piston having an opening therethrough reciprocating in said chamber, the hole in said piston being closed by the wall of said chamber at the lowermost position of the piston and opened to provide communication between the space above the piston and the space below the piston adjacent the outlet when the piston is moved upwardly from its lowermost position whereby upon such movement liquid is dispensed in measured quantity, said piston when raised from its lowermost position passing over the opening through which liquid is supplied to said chamber whereby to close said opening.

3. In a liquid dispensing apparatus, the combination of a vertically extending hollow cylindrical measuring chamber having air inlet and outlet means at its upper end, liquid outlet means at its lower end, and an opening in the side wall thereof to admit liquid to be measured, a piston having a depending rod arranged to reciprocate in said chamber with the depending rod extending downwardly in the liquid outlet at the lower end thereof, an opening through said piston providing communication between the space above said piston in said chamber and the space below said piston communicating with said liquid outlet, said opening through the piston being closed by a wall of the chamber when said piston occupies its lowermost position, said opening in the side wall to admit liquid to be measured being positioned so that when said piston moves upwardly from its lowermost position said position passes over said opening and closes it.

4. In a liquid dispensing apparatus, the combination of a hollow cylinder positioned at the bottom of a liquid supply chamber partially in said chamber and partially externally thereof, means including a disk positioned in the upper part of said cylinder for adjustably determining the quantity of liquid dispensed in each operation, means including a hollow rod extending upwardly from said disk to admit air to said cylinder, means for discharging liquid from said cylinder including a bottom having a generally cone-shaped interior configuration converging downwardly and terminating in a spout, a piston arranged to reciprocate in said cylinder having generally cone-shaped upper and lower surfaces converging downwardly, and an opening extending generally downwardly from the lowermost point of the upper surface of said piston to the lower surface of said piston, said lower surface of the piston being adapted to cooperate with and seat upon the cone-shaped bottom of said cylinder and to close said opening through the piston, and an opening in the vertical wall of the cylinder providing communication between the interior of the cylinder and the liquid supply chamber, said opening being located immediately above the upper edge of the piston when said piston is seated on the bottom of the cylinder whereby when said piston is moved upwardly said piston passes over said last-named opening, closing the same, a stem projecting downwardly from the central portion of said piston in said spout, said stem being slotted to permit liquid to pass through said spout, an annular member arranged to reciprocate on the exterior of said spout and projecting inwardly below said spout to abut the lower end of said piston stem whereby said piston is reciprocated when said annular member is reciprocated, and means positioned on the frame of said apparatus to guide said annular member and limit its downward movement.

5. In a liquid dispensing apparatus, the combination of a measuring chamber, means for supplying liquid to said chamber, and means for varying the capacity of said chamber and providing an air passage between the interior of said chamber and the exterior, including a slidably mounted plunger adjustably positionable within said chamber and having said air passage formed therein, said measuring chamber having a loosely fitting cap thereon provided with an upwardly extending supporting member, said loosely fitting cap having an opening therein loosely receiving the rod portion of said plunger and said upwardly extending supporting member having means thereon clampingly engaging the rod portion of said plunger for supporting said plunger in any position to which it is adjusted.

6. In a cream dispensing apparatus a measuring chamber having air inlet and outlet means at its upper end and cream outlet means at its lower end, means including an opening in the chamber wall to supply cream to be dispensed to said chamber, a slidably mounted plunger adjustably positionable with respect to the side walls of said chamber which are fixed and providing an adjustable upper wall for said chamber, a piston having an opening therethrough reciprocating in said chamber, the hole in said piston being closed by the wall of said chamber at the lowermost position of the piston and opened to provide communication between the space above the piston and the space below the piston adjacent the outlet when the piston is moved upwardly from its lowermost position whereby upon such movement cream is dispensed in measured quantity, said piston when raised from its lowermost position passing over the opening through which cream is supplied to said chamber whereby to close said opening, and said plunger having an opening therein providing said air inlet and outlet means at the upper end of said chamber.

7. In a cream dispensing apparatus the combination of a vertically extending, hollow cylindrical measuring chamber having air inlet and outlet means at its upper end, cream outlet means at its lower end affording free passage to the exterior of said apparatus at all times, and an opening in the side wall thereof to admit cream to be measured and dispensed, a piston having a depending rod arranged to reciprocate in said chamber with the depending rod extending downwardly in the cream outlet at the lower end thereof, an opening through said piston providing communication between the space above said piston in said chamber and the space below said piston communicating with said cream outlet, said opening through the piston being closed by a wall of the chamber when said piston occupies its lowermost position, said opening in the side wall to admit cream to be measured and dispensed being positioned so that when said piston moves upwardly from its lowermost position said piston passes over said opening and closes it.

8. In a cream dispensing device the combination of a cylindrical adjustable measuring chamber having an opening in the side wall thereof to admit cream to be measured and dispensed, an outlet at the bottom of said measuring chamber, a piston having a depending rod arranged to reciprocate in said chamber with the depending rod extending downwardly in the cream outlet at the lower end thereof, an opening through said piston providing communication between the space above said piston in said cylinder and the space below said piston communicating with the cream outlet, said opening through the piston being closed by a wall of the cylinder when said piston occupies its lowermost position and said opening in the side wall to admit cream to be measured and dispensed being positioned so that when said piston occupies its uppermost position it passes over said opening in the side wall and closes it, said piston and depending rod being arranged so that force exerted upwardly adjacent the exterior of said outlet acting on said rod moves said piston to its uppermost position, said piston returning to its lowermost position upon release of said force.

9. In a cream dispensing apparatus the combination of a vertically extending, hollow cylinder having cream outlet means at its lower end, cream inlet means in the side wall thereof, and a slidably mounted plunger adjustably positionable in the upper portion of said hollow cylinder and forming with said hollow cylinder a measuring chamber of adjustable capacity, said plunger having an opening therein providing air inlet and outlet means for said measuring chamber, a free floating piston having a depending rod arranged to reciprocate in said measuring chamber with the depending rod extending downwardly in the cream outlet to provide means for moving said piston upwardly in said measuring chamber, said piston having an opening therethrough providing communication between the space above said piston and the space below, which opening is closed by a wall of the cylinder when said piston occupies its lowermost position, said opening in the side wall to admit cream to be measured being positioned so that when said piston occupies its uppermost position it extends over said opening and closes it.

10. In a liquid dispensing apparatus, the combination of a measuring chamber having an opening in its side wall to admit a liquid to be dispensed and an opening in its lower extremity to discharge the measured quantity of liquid, a free floating piston having an opening therethrough arranged in the measuring chamber to reciprocate adjacent the outlet, the lower face of the piston surrounding said opening through the piston being adapted to abut the bottom wall of the measuring chamber and close said opening through the piston when said piston is in its lowermost position, and said piston being arranged to pass over and close said opening in the side wall of the measuring chamber in its uppermost position whereby when said piston is in its uppermost position the contents of said measuring chamber are discharged and when said piston is in its lowermost position the chamber is supplied with liquid to be dispensed.

11. In a cream dispensing device, the combination of a cream supply chamber, a measuring chamber located at least partially within said cream supply chamber and having a bottom wall shaped generally like an inverted cone, means providing a fluid connection between said cream supply chamber and said measuring chamber, an outlet located centrally of the bottom of said measuring chamber, terminating exteriorly of said cream supply chamber and providing means for completely discharging the contents of the chamber by gravity, a piston mounted to reciprocate in said chamber and having a bottom face conforming generally to the shape of the bottom wall of said measuring chamber and means responsive to an upwardly directed force exerted adjacent the exterior of said outlet for moving said piston upwardly within said measuring chamber, said piston having a hole therethrough which is closed by the bottom wall of said chamber at the lowermost position of said piston and opened to provide communication between the space above the piston and the outlet when the piston is moved upwardly from its lowermost position by said piston moving means, whereby upon such movement cream is despensed in measured quantity, said piston when raised from its lowermost position also passing over said means providing a fluid connection between said cream supply chamber and said measuring chamber whereby to close said fluid connection and said piston being adapted to return to its lowermost position when force applied to said piston moving means is released.

CHARLES E. SWANN.